(12) United States Patent
Miyata

(10) Patent No.: US 6,478,837 B1
(45) Date of Patent: *Nov. 12, 2002

(54) ABRASIVE COMPOSITION SUBSTRATE FOR MAGNETIC RECORDING DISKS AND PROCESS FOR PRODUCING SUBSTRATES FOR MAGNETIC RECORDING DISK

(75) Inventor: Norihiko Miyata, Shorjiri (JP)

(73) Assignee: Showa Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/701,042

(22) PCT Filed: Jun. 28, 2000

(86) PCT No.: PCT/JP00/04245

§ 371 (c)(1),
(2), (4) Date: Apr. 5, 2001

(87) PCT Pub. No.: WO01/00745

PCT Pub. Date: Apr. 1, 2001

Related U.S. Application Data

(60) Provisional application No. 60/166,757, filed on Nov. 22, 1999.

(30) Foreign Application Priority Data

Jun. 28, 1999 (JP) ............................................ 11-181753

(51) Int. Cl.$^7$ .............................. C09K 3/14; C09G 1/02
(52) U.S. Cl. ............................ 51/309; 106/3; 510/167; 510/397; 451/36

(58) Field of Search ....................... 51/307, 309; 106/3; 451/36; 510/167, 397, 175; 438/692, 693; 252/79.1, 79.2; 216/89

(56) References Cited

U.S. PATENT DOCUMENTS

| | | | | | |
|---|---|---|---|---|---|
| 4,959,113 | A | * | 9/1990 | Roberts | 51/309 |
| 5,697,992 | A | * | 12/1997 | Ueda et al. | 51/307 |
| 5,861,054 | A | * | 1/1999 | Miyashita et al. | 106/3 |
| 6,152,976 | A | * | 11/2000 | Ishitobi et al. | 51/309 |
| 6,274,063 | B1 | * | 8/2001 | Li et al. | 438/692 |

FOREIGN PATENT DOCUMENTS

| | | | |
|---|---|---|---|
| JP | 7-187613 | 7/1995 | C01B/13/14 |
| JP | 10-121035 | 5/1998 | C09K/3/14 |
| JP | 11-198028 | 7/1999 | B24B/37/00 |
| WO | 95/04700 | 2/1965 | C01B/13/32 |

* cited by examiner

Primary Examiner—Michael Marcheschi
(74) Attorney, Agent, or Firm—Sughrue Mion, PLLC

(57) ABSTRACT

An abrasive composition for substrates for magnetic recording disks and a process for producing a substrate for a magnetic recording disk are provided, which enable lowering of surface roughness of a substrate for a magnetic recording disk; form no nodules, polishing scratches, and minute defects such as micropits; and enable polishing at economical speeds. The abrasive composition comprises at least water, titanium oxide fine particles and an abrasion promoter, wherein 90-100% of the titanium oxide is constituted by a single crystal structure.

11 Claims, No Drawings

ABRASIVE COMPOSITION SUBSTRATE FOR MAGNETIC RECORDING DISKS AND PROCESS FOR PRODUCING SUBSTRATES FOR MAGNETIC RECORDING DISK

CROSS-REFERENCE TO RELATED APPLICATIONS

This application claims priority from Japanese Patent application No. 11-181753 filed Jun. 28, 1999 and benefit from U.S. Provisional application No. 60/166,757 filed Nov. 22, 1999.

TECHNICAL FIELD

The present invention relates to an abrasive composition for substrates for magnetic recording disks, and more particularly to an abrasive composition for substrates for magnetic recording disks and a process for producing a substrate for a magnetic recording disk, which are employed to obtain a magnetic disk surface of high accuracy such that the flying-height of a magnetic head from the disk can be reduced.

BACKGROUND ART

Magnetic recording disks (memory hard disks) are widely used in the external memories of computers and word processors, as a means giving quick access. A typical example of such a magnetic recording disk is one which is produced by preparing an original substrate by subjecting an Al alloy substrate to electroless plating of NiP on the surface, surface-polishing the original substrate, and thereafter sequentially forming a Cr-alloy underlayer, a Co-alloy magnetic film, and a carbon protective film by sputtering.

When irregularities or nodules which are higher than the flying-height of a magnetic head remain on the surface of a magnetic recording disk, the magnetic head which flies over the disk at a predetermined flying-height and high speed may hit such nodules, causing damage to the head. When a substrate for a magnetic recording disk has nodules and polishing scratches, in the case of formation of a Cr-alloy underlayer or a Co-alloy magnetic film on the substrate, nodules and defects attributed to the polishing scratches arise on the surface of the film, and thus the resulting magnetic recording disk fails to have an even surface of high accuracy. Therefore, in order to produce a magnetic recording disk having a surface of high accuracy, the substrate of the disk must be accurately polished.

In view of the foregoing, there have been proposed many abrasive compositions which remove nodules or minimize the height of nodules, and rarely form polishing scratches during polishing of substrates for magnetic recording disks. For example, an abrasive composition containing alumina or an aluminum compound having a particle size of approximately 1 $\mu$m serving as an abrasive particle can be used for polishing substrates for magnetic recording disks with such accuracy that magnetic heads do not hit nodules of the magnetic recording disk at the conventional flying-height of the head. However, even when this composition is employed, high surface accuracy of a magnetic recording disk, which is required to meet the current demand for attaining high recording density, cannot be accomplished. Meanwhile, when an abrasive composition comprising colloidal silica particles having a size of several tens of nm serving as an abrasive particle is employed, high surface accuracy can be easily accomplished. However, when this composition is employed, desired productivity cannot be accomplished because of low abrasion rate. In addition, when a substrate for a magnetic recording disk is polished by use of this composition for a prolonged period of time, the circumferential edge of the substrate is excessively abraded (this phenomenon is called "roll-off").

Japanese Patent Application-Laid-Open (kokai) No. 10-121035 discloses an abrasive composition comprising titanium oxide (titania) fine particles having a size of sub-microns serving as an abrasive particle. When this composition is employed, high surface accuracy and abrasion rate can be easily accomplished. The composition disclosed in the above publication contains rutile-type titanium oxide. The publication describes that rutile-type titanium oxide has small crystal cells, dense structure, and high hardness, and thus the composition exhibits excellent polishing efficiency, and that the percentage of rutile-type titanium oxide in overall titanium oxide (i.e., rutilation percentage) is preferably 10–80% since rutile-type titanium oxide tends to form polishing scratches.

The aforementioned publication describes that titanium oxide having a rutilation percentage of 10–80% is preferable. However, when several types of titanium oxide of different crystal structures coexist, titanium oxide is not uniformly ground or milled in formation of fine particles, and thus particle size distribution of high accuracy and sharpness is difficult to obtain. As a result, when an abrasive composition containing such titanium oxide is employed, minute defects such as micropits and microscratches may arise, though not frequently, on the substrate for a magnetic recording disk, and the yield of the substrate may be lowered.

An abrasive composition for substrates for aluminum magnetic recording disks which enable high-density magnetic recording must have sufficient quality that disk surfaces of high accuracy which facilitate reduction of the head flying-height can be accomplished.

DISCLOSURE OF INVENTION

In view of the foregoing, an object of the present invention is to provide an abrasive composition for substrates for magnetic recording disks and a process for producing a substrate for a magnetic recording disk, which enable lowering of surface roughness of a magnetic recording disk; form no irregularities or nodules, polishing scratches, and minute defects such as micropits and microscratches; enable high-density recording of the disk; and enable polishing at energy-saving speed.

The present inventors have performed extensive studies and have found that, when an abrasive compound which is constituted by titanium oxide having as close to a single type of structure as possible and not comprising a large amount of crystals having different structures is crushed or ground, a sharp particle size distribution is obtained; and that when such a compound is employed, the surface of high accuracy of a substrate for a magnetic recording disk which enables lowering of the head flying-height can be obtained, and occurrence of usual polishing scratches, particularly minute defects attributed to small polishing scratches can be prevented. The present invention has been accomplished on the basis of these findings. Titanium oxide may be of any crystal structure type so long as any one type of the crystal structures (single crystal structure alone) accounts for 90% or more of the titanium oxide.

Accordingly, the present invention provides an abrasive composition for substrates for magnetic recording disks, which comprises at least water, titanium oxide fine particles, and an abrasion promoter, characterized in that 90–100% of the titanium oxide is of a single crystal structure type.

In addition, a process for producing a substrate for a magnetic recording disk comprising the step of supplying the aforesaid abrasive composition.

The abrasive composition of the present invention is advantageously used for, for example, a substrate having a high recording density (generally, a recording density of 1 Gbit/inch$^2$ or more), such as a magnetic recording disk for magnetic head utilizing magnetoresistance (MR) effects. Also, the composition may effectively be used for a magnetic recording disk having a recording density lower than that of the aforementioned value, in consideration of enhancement of reliability.

BEST MODE FOR CARRYING OUT THE INVENTION

In a conventional substrate for a magnetic recording disk, polishing scratches of approximately 10 nm or more in depth cause problems. Meanwhile, in a low-flying-height-type hard disk substrate which is targeted by the present invention, a fine polishing scratch having a depth of approximately 5 nm, which has not caused problems, will induce errors in magnetic characteristics. Therefore, a substrate for a magnetic recording disk having such fine scratches is considered to fall outside the acceptable range as regards practical use.

Titanium oxide fine particles contained in the abrasive composition of the present invention as an abrasive compound comprise titanium oxide constituted by a single type of crystal structure in an amount of 90–100%. Namely, the particles comprise titanium oxide of any one type of anatase, rutile, and brookite in an amount of 90–100%. The particles may comprise titanium oxide having either or both of the other two structures in an amount of less than 10%. For example, the particles comprise anatase-type titanium oxide in an amount of 90% or more and rutile-type and/or brookite-type titanium oxide in an amount of less than 10%. When the particles comprise titanium oxide constituted by a single type of crystal structure in an amount of less than 90%, i.e., the other one having either or both structure types in an amount of 10% or more, it is difficult to obtain a sharp particle size distribution.

The crystal structure of titanium oxide can be identified by means of X-ray diffraction (use of CuKα rays) as described below. The percentage of rutile-type titanium oxide can be obtained through calculation by use of the ratio of peak intensity corresponding to a (110) plane (rutile) to that corresponding to a (101) plane (anatase) in X-ray diffraction. A (101) plane (anatase) overlaps a (120) plane (brookite), but a (121) plane (brookite) (relative intensity: 90%) does not overlap the entirety of the anatase plane. Therefore, the intensity of the (120) plane (brookite) (×100/90) is obtained on the basis of the peak intensity for the anatase plane, and the existent percentages of anatase- and brookite-type titanium oxide can be obtained on the basis of the intensity of the (120) plane (brookite) and the peak intensity of the (101) plane (anatase).

The method for producing titanium oxide is not particularly limited in the present invention. Typical examples of the method include the sulfate process comprising a reaction between sulfuric acid and ilmenite or titanium slag, melting, hydrolysis, and calcination; and the chloride process in which the mineral rutile is dehydrated at a temperature range of red-heat, and the mineral is brought into contact with chlorine gas in a chlorination furnace heated to approximately 800° C., to thereby gasify titanium in the form of chloride, and the chloride is distilled and the resultant titanium tetrachloride is directly thermally-decomposed, to thereby produce titanium oxide.

The crystal structure of titanium oxide is described below. For example, in a gas-phase method in which titanium oxide is produced through combustion of a mixture of titanium tetrachloride and oxygen, stable anatase-type titanium oxide is firstly produced at low temperature. When the titanium oxide is subjected to thermal treatment and combusted at a temperature range of 816–1040° C., brookite-type titanium oxide is produced, and in a temperature range higher than the above range, rutile-type titanium oxide is produced (Rikagaku-Jiten 3rd ed., p. 514–515).

Titanium oxide constituted by a single type of crystal structure in an amount of 90% or more is commercially available, and such titanium oxide may be employed in the present invention, if necessary, after the particle size is regulated through grinding or removal of coarse particles.

In the particle size distribution of secondary particles of titanium oxide which is employed in the present invention, when the particle size at the point at which the cumulative amount of the particles is 90 wt. % is referred to as "D90" (i.e., the amount of the particles having a particle size of D90 or less is 90 wt. %) and the particle size at the point at which the cumulative amount of the particles is 10 wt.% is referred to as "D10" (i.e., the amount of the particles having a particle size of D10 or less is 10 wt. %), the ratio of D90 to D10, i.e., D90/D10 is preferably 3 or less, more preferably 2.7 or less. In this case, the lower the ratio is, the sharper the particle size distribution becomes.

In the present invention, the secondary particle of titanium oxide preferably has an average particle size of 0.1–1.0 μm. The average particle size of the secondary particle is measured by means of a controlled reference method of dynamic light scattering using Microtrac UPA 150 (product of Honeywell).

The abrasion rate of a substrate when titanium oxide fine particles are employed largely depends on the size of the secondary particles. When the size of the secondary particles increases, the abrasion rate becomes high, but polishing scratches tends to arise. As a result, problems with the magnetic characteristics of a magnetic recording disk may occur. In addition, it is difficult to reduce polishing scratches on a substrate to such a degree that the substrate can be used as a low-flying-height-type hard disk substrate. Therefore, the average particle size of secondary particles of titanium oxide is preferably 1.0 μm or less. In consideration of enhancement of abrasion rate and reduction of roll-off (undesirably excessive abrasion at the circumferential edge of a substrate surface), the average particle size is preferably 0.1 μm or more.

Meanwhile, when the size of primary particles increases, polishing scratches tend to arise. When the average particle size of secondary particles falls within the above range and the size of primary particles is small, abrasion rate increases and occurrence of polishing scratches can be prevented. Therefore, the average value of primary particle size (i.e., average value of major and minor axes), which is determined by use of a SEM photograph, preferably falls within a range of 0.01–0.6 μm.

When the amount of titanium oxide in the abrasive composition of the present invention is small, abrasion rate is low. When the amount is larger, abrasion rate becomes higher, but when the amount is in excess of 15 wt. %, abrasion rate does not increase commensurately. In consideration of costs in practical use, the upper limit of the amount is 20 wt. %. Therefore, the amount of titanium oxide in the abrasive composition preferably falls within a range of 2–20 wt. %.

In the abrasive composition of the present invention, titanium oxide exhibits physical abrading action. In order to further enhance polishing efficiency, an abrasion promoter which exhibits chemical action on a substrate is incorporated into the composition. Examples of abrasion promoters which may be employed include aluminum nitrate ($Al(NO_3)_3$), aluminum sulfate ($Al_2(SO_4)_3$), aluminum oxalate ($Al_2(C_2O_4)_3$), iron nitrate ($Fe(NO_3)_3$), aluminum lactate ($Al(C_3H_5O_3)_3$), gluconic acid ($C_6H_{12}O_7$), and malic acid ($C_4H_6O_5$). Of these, aluminum salts and nitrates are preferable, and aluminum nitrate is particularly preferable. These abrasion promoters may be employed singly or in combination of two or more species. An abrasion promoter exhibits chemical action such as a corrosive action on a substrate, and thus polishing efficiency of the substrate is drastically enhanced by the combination of chemical function of the abrasion promoter and physical abrading action of titanium oxide. In addition, in order to effectively enhance polishing efficiency, a water-soluble oxidizing agent is incorporated into the composition in addition to an abrasion promoter. Examples of water-soluble oxidizing agents which may be employed include hydrogen peroxide ($H_2O_2$), nitric acid, potassium permanganate ($KMnO_4$), perchloric acid ($HClO_4$), sodium perchlorate ($NaClO_4$), and sodium hypochlorite ($NaClO$) These oxidizing agents may be used singly or in a combination of two or more species. Even when a very large amount of the oxidizing agent is incorporated into the composition, the effect of the oxidizing agent does not increase, and thus the amount of the oxidizing agent is appropriately 10 wt. % or less.

The amount of an abrasion promoter contained in the composition is 0.1–20 wt. %, preferably 1–15 wt. %. When the amount is less than 0.1 wt. %, abrasion rate decreases. Therefore, a long time is required to polish a predetermined amount of a substrate, and thus the circumferential edge of a substrate surface is undesirably abraded in excess. When the amount of an abrasion promoter is increased up to 15 wt. %, abrasion rate increases. However, when the amount exceeds 15 wt. %, abrasion rate no longer increases. Therefore, although incorporation of more than 15 wt. % of the abrasion promoter does not exhibit adverse effects, from the economical viewpoint, the upper limit of the amount is determined to be 20 wt. %.

It should be noted that the aforementioned amount of each ingredient in the composition is the amount when the composition is employed for polishing a substrate for a magnetic recording disk. Therefore, it is efficient to produce and ship the abrasive composition containing the aforementioned ingredients in amounts larger than those specified, and then to dilute the composition down to the aforementioned amounts upon use.

The abrasive composition of the present invention for substrates for magnetic recording disks is a slurry comprising titanium oxide containing the aforementioned anatase-type, rutile-type, or brookite-type titanium oxide in an amount of 90–100%; an abrasion promoter; and water. If necessary, the composition may further contain a water-soluble oxidizing agent. In addition, the composition may contain a surfactant, a preservative, and an acid or alkali for regulating pH. When the composition contains acid salts of aluminum, such as aluminum nitrate as an abrasion promoter, the pH of the composition is preferably 2–5. When the pH is lower than 2, the composition may cause corrosion of polishing apparatus, and problems on operation, whereas when the pH is higher than 5, polishing efficiency may be reduced, which is unsatisfactory.

The abrasive composition of the present invention can be prepared by suspending titanium oxide constituted by the aforementioned crystal structure in water and adding an abrasion promoter to the resultant suspension, in the same manner as with a conventional abrasive composition.

No particular limitation is imposed on the type of magnetic hard disk substrate to which the abrasive composition of the present invention is applied. However, when the composition is applied to an aluminum substrate, particularly an aluminum substrate subjected to electroless plating of NiP, a polishing surface of high quality can be obtained industrially in an advantageous manner, by synergism between physical abrading action of titanium oxide and chemical function of an abrasion promoter.

Polishing is carried out as described below. A polishing pad which is generally used for a slurry abrasive composition is placed on an original substrate for a magnetic recording disk, and the pad or the original substrate is rotated while the slurry is fed between the pad and the original substrate.

A magnetic recording disk comprising a substrate which is polished by use of the abrasive composition of the present invention rarely contains minute defects such as micropits and microscratches, and has a surface roughness (Ra) of approximately 3–5 Å and excellent evenness.

EXAMPLES

Hereafter, the present invention will next be described in more detail by way of examples, which should not be construed as limiting the invention thereto.

(Examples 1 to 16)

Super Titania F-10 (rutile-type titanium oxide: 98 wt. %, anatase-type titanium oxide: 2 wt. %) and Super Titania F-4 (anatase-type titanium oxide: 95 wt. %, rutile-type titanium oxide: 5 wt. %) (products of Showa Titanium K. K.), serving as titanium oxide of high purity, were separately ground by use of a medium-stirring mill. In each of two types of titanium oxide, a small amount of coarse particles were removed, to thereby obtain titanium oxide particles having an average particle size of 0.3 μm. For each titanium oxide, a crystal structure type and the content of the type was measured by use of RAD-2B (product of Rigaku Denki). In Table 1, these two types of titanium oxide, i.e., Super Titania F-10 and F-4 are shown as titania (1) and titania (2), respectively.

The particle size was measured by means of a controlled reference method of dynamic light scattering using Microtrac UPA 150 (product of Honeywell). The measurements of particle size are shown in Table 1.

Subsequently, the above-obtained titanium oxide, abrasion promoters, and in some cases, oxidizing agents were mixed in the proportions shown in Table 2, to thereby prepare different aqueous abrasive compositions. Polishing was carried out under the following conditions using the following polishing machine and abrasive compositions. When aluminum nitrate was employed as an abrasion promoter, the pH of the composition was 2.3–4.1.

Polishing Test

Substrate Employed

A 3.5 inch aluminum disk on which NiP was electroless-plated.

Polishing Machine and Polishing Conditions

Polishing testing machine: a 4-way double-sided polishing machine

Pad for polishing: a suede pad (type: Politex DG, product of Rodel)

Number of revolution of lower surface plate: 60 rpm

Feed rate of crude aqueous abrasive composition: 50 ml/min.

Polishing time: 5 minutes

Working pressure: 50 g/cm$^2$

Evaluation of Polishing Characteristics

Rate of abrasion: Calculated by difference in weight before and after polishing the aluminum disk Surface roughness (Ra): Measured by use of Talystep, Talydata 2000 (product of Rank Taylor Hobson)

The depths of polishing scratches and polishing pits were obtained through three-dimensional shape analysis by use of a stylus-equipped surface analysis apparatus (Model P-12, product of TENCOR).

The results of evaluation of polishing characteristics are shown in Table 2. In Table 2, rating "A" refers to the case in which a polishing scratch has a depth of 5 nm or less, or a pit has a depth of 5 nm or less, and rating "B" refers to the case in which a polishing scratch has a depth of 5–10 nm, or a pit has a depth of 5–10 nm. In the examples and comparative examples, no polishing scratches having a depth exceeding 10 nm or pits having a depth exceeding 10 nm occurred.

Incidentally, an abrasive composition comprising titanium oxide containing brookite-type titanium oxide in an amount of 90–100% exhibited the same effect as the composition of the examples.

Comparative Examples 1 and 2

Super Titania F-1 (rutile-type titanium oxide: 50 wt. %, anatase-type titanium oxide: 50 wt. %) and Super Titania F-2 (rutile-type titanium oxide: 16 wt. %, anatase-type titanium oxide: 84 wt. %) (products of Showa Titanium K. K.), serving as titanium oxide, were employed, and the aqueous abrasive compositions shown in Table 2 were prepared. Polishing was carried out in the same manner as in the examples. The results are shown in Table 2. The measurements of the particle size of titanium oxide particles are shown in Table 1. In Tables 1 and 2, Super Titania F-2 and F-1 are shown as titania (3) and titania (4), respectively.

TABLE 1

| Type of titanium oxide | Crystal structure and content of titanium oxide (wt. %) | Primary particle diameter (average) ($\mu$m) | Secondary particle diameter (average) ($\mu$m) | D90/D10 |
|---|---|---|---|---|
| Titania(1) | Rutile-type 98 Anatase-type 2 | 0.2 | 0.3 | 2.4 |
| Titania(2) | Anatase-type 95 Rutile-type 5 | 0.05 | 0.3 | 2.6 |
| Titania(3) | Rutile-type 16 Anatase-type 84 | 0.06 | 0.3 | 3.4 |
| Titania(4) | Rutile-type 50 Anatase-type 50 | 0.1 | 0.5 | 3.4 |

TABLE 2

| | Abrasive | | Promoter | | Oxidizing agent | | Abrasion rate ($\mu$m/min) | Surface roughness (Ra) (Å) | Polishing scratch | Pit |
|---|---|---|---|---|---|---|---|---|---|---|
| | Kind | Amount (wt. %) | Kind | Amount (wt. %) | Kind | Amount (wt. %) | | | | |
| Ex. 1 | Titania(1) | 1 | Aluminum nitrate | 5.0 | — | | 0.12 | 4 | A | A |
| Ex. 2 | Titania(1) | 5 | Aluminum nitrate | 5.0 | — | | 0.25 | 4 | A | A |
| Ex. 3 | Titania(1) | 10 | Aluminum nitrate | 5.0 | — | | 0.28 | 5 | A | A |
| Ex. 4 | Titania(1) | 20 | Aluminum nitrate | 5.0 | — | | 0.30 | 6 | A | A |
| Ex. 5 | Titania(1) | 5 | Aluminum nitrate | 0.05 | — | | 0.10 | 5 | A | A |
| Ex. 6 | Titania(1) | 5 | Aluminum nitrate | 0.1 | — | | 0.13 | 4 | A | A |
| Ex. 7 | Titania(1) | 5 | Aluminum nitrate | 1.0 | — | | 0.17 | 4 | A | A |
| Ex. 8 | Titania(1) | 5 | Aluminum nitrate | 2.0 | — | | 0.21 | 4 | A | A |
| Ex. 9 | Titania(1) | 5 | Aluminum nitrate | 10.0 | — | | 0.29 | 4 | A | A |
| Ex. 10 | Titania(2) | 5 | Aluminum nitrate | 5.0 | — | | 0.28 | 4 | A | A |
| Ex. 11 | Titania(1) | 5 | Aluminum nitrate | 2.0 | $H_2O_2$ | 1.0 | 0.25 | 4 | A | A |
| Ex. 12 | Titania(1) | 5 | Aluminum nitrate | 2.0 | $HNO_3$ | 0.2 | 0.25 | 4 | A | A |
| Ex. 13 | Titania(1) | 5 | Aluminum oxalate | 2.0 | — | | 0.16 | 6 | A | A |
| Ex. 14 | Titania(1) | 5 | Iron nitrate | 2.0 | — | | 0.20 | 5 | A | A |
| Ex. 15 | Titania(1) | 5 | Aluminum lactate | 2.0 | — | | 0.18 | 5 | A | A |
| Ex. 16 | Titania(1) | 5 | Gluconic acid | 1.0 | — | | 0.17 | 5 | A | A |
| Comp. Ex. 1 | Titania(3) | 5 | Aluminum nitrate | 5.0 | — | | 0.21 | 4 | B | B |
| Comp. Ex. 2 | Titania(4) | 5 | Aluminum nitrate | 5.0 | — | | 0.23 | 6 | B | B |

INDUSTRIAL APPLICABILITY

When a disk is polished by use of the abrasive composition of the present invention, the disk has reduced surface roughness and the incidence of minute defects such as micropits and microscratches on the polished surface is also reduced. In addition, polishing can be carried out at high polishing rate. A magnetic recording disk comprising the polished disk is useful as a low-flying-height-type hard disk, capable of achieving high-density recording.

Particularly, a magnetic recording disk comprising the polished disk is very useful as a medium having a high recording density (a recording density of 1 Gbit/inch$^2$ or more), such as a medium for a magnetic head utilizing magnetoresistance effects. Also the disk is useful as a medium having a recording density lower than that of the aforementioned value, in consideration of high reliability.

What is claimed is:

1. An abrasive composition for polishing a substrate for a magnetic recording disk, which comprises water, titanium oxide fine particles and an abrasion promoter, wherein 90–100% of the titanium oxide is constituted by a single crystal structure.

2. An abrasive composition according to claim 1, wherein a particle size distribution of secondary particles of the titanium oxide fine particles satisfies the following formula:

$$D90/D10 \leq 3.0$$

where D90 denotes a particle size, where 90 wt. % of the titanium oxide particles are equal to or smaller than the size, and where D10 denotes a particle size, where 10 wt. % of the titanium oxide particles are equal to or smaller than the size.

3. An abrasive composition according to claim 1 or 2, wherein an average particle size of a primary particle of the titanium oxide is in the range of 0.01 to 0.6 μm, and an average particle size of a secondary particle of the titanium oxide is in the range of 0.1 to 1.0 μm.

4. An abrasive composition according to claim 1 or 2, wherein the abrasion promoter is an aluminum salt.

5. An abrasive composition according to claim 4, wherein the aluminum salt is aluminum nitrate.

6. An abrasive composition according to claim 1 or 2, which further comprises a water-soluble oxidizing agent.

7. A process for polishing a substrate for a magnetic recording disk, the process comprising the step of polishing an original disk for magnetic recording disks with the abrasive composition according to claim 1 or 2.

8. A process for polishing a substrate for a magnetic recording disk, the process comprising the step of polishing an original disk for magnetic recording disks with the abrasive composition according to claim 1 or 2 placed between the original disk and a polishing pad while rotating at least one of the original disk and the polishing pad.

9. An abrasive composition according to claim 4, wherein the aluminum salt is aluminum nitrate, aluminum sulfate, aluminum oxalate or aluminum lactate.

10. An abrasive composition according to claim 1, wherein the abrasion promoter is a nitrate.

11. An abrasive composition according to claim 10, wherein the nitrate is aluminum nitrate or iron nitrate.

* * * * *

UNITED STATES PATENT AND TRADEMARK OFFICE
CERTIFICATE OF CORRECTION

PATENT NO. : 6,478,837 B1
DATED : November 12, 2002
INVENTOR(S) : Norihiko Miyata It is certified that error appears in the above-identified patent and that said Letters Patent is hereby corrected as shown below:

<u>Title page, Item [54] and Column 1, lines 1-4,</u>
Title, please change "ABRASIVE COMPOSITION SUBSTRATE FOR MAGNETIC RECORDING DISKS AND PROCESS FOR PRODUCING SUBSTRATES FOR MAGNETIC RECORDING DISK" to -- ABRASIVE COMPOSITION FOR SUBSTRATES FOR MAGNETIC RECORDING DISKS AND PROCESS FOR PRODUCING SUBSTRATE FOR MAGNETIC RECORDING DISK --

<u>Title page,</u>
Item [75], Inventors, please change "Shorjiri" to -- Shiojiri --.

Signed and Sealed this

Tenth Day of June, 2003

JAMES E. ROGAN
*Director of the United States Patent and Trademark Office*